GEORGE WESTINGHOUSE, Jr.
Improvement in Steam Power Air Brake.
No. 123,067.
Patented Jan. 23, 1872.
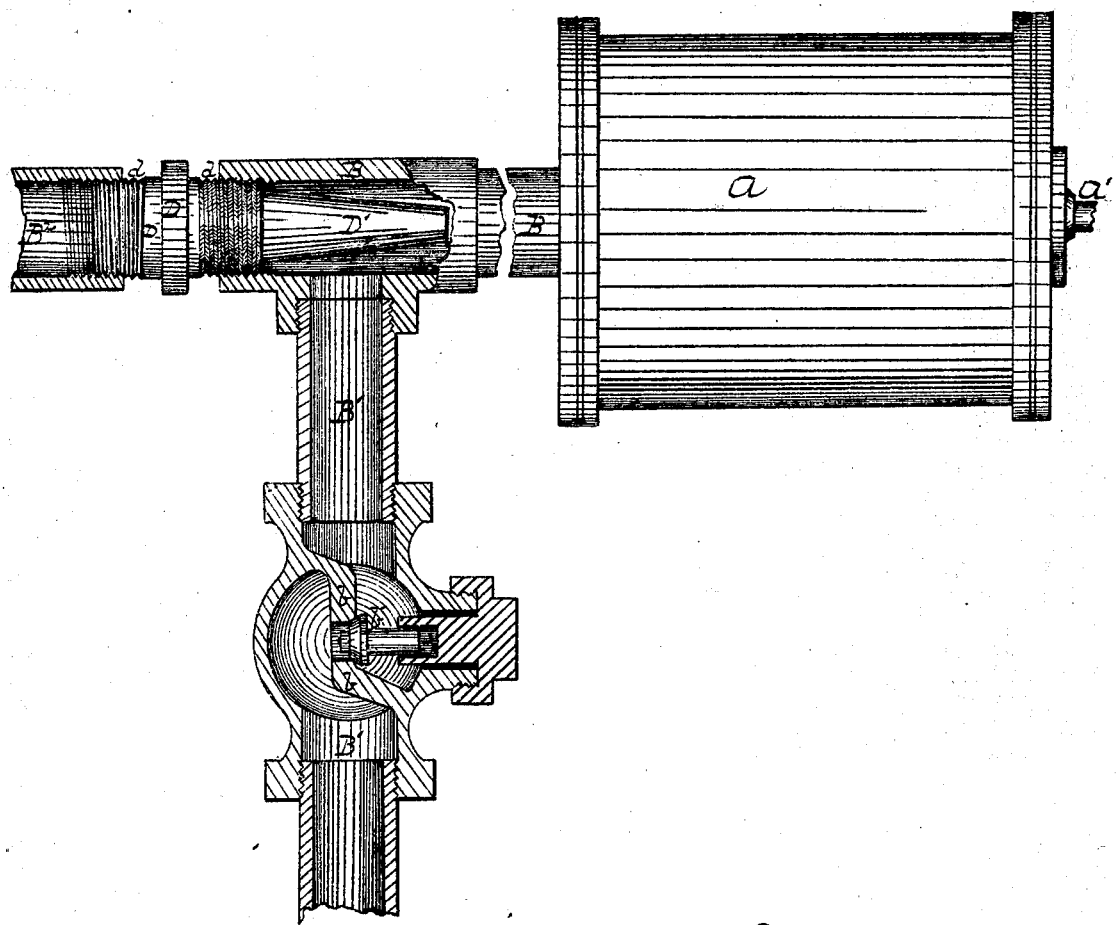
Witnesses:
James S. Kay.
E. C. Fitler.
Inventor:
George Westinghouse Jr.
by Bakewell, Christy & Kerr,
his Attys.

123,067

UNITED STATES PATENT OFFICE.

GEORGE WESTINGHOUSE, JR., OF PITTSBURG, PENNSYLVANIA.

IMPROVEMENT IN STEAM-POWER AIR-BRAKES.

Specification forming part of Letters Patent No. 123,067, dated January 23, 1872.

SPECIFICATION.

*To all whom it may concern:*

Be it known that I, GEORGE WESTINGHOUSE, Jr., of Pittsburg, in the county of Allegheny and State of Pennsylvania, have invented a new and useful Improvement in Steam-Power Air-Brake; and I do hereby declare the following to be a full, clear, and exact description thereof, reference being had to the accompanying drawing making part of this specification, which represents a steam-jet pipe, air-pipe, and air-cylinder, with the necessary devices for illustrating the operation of my invention.

In the air-brakes now in common use an air-pump is employed to compress the air, by the application of which to a piston the brake-shoes are applied to the wheels. I have found that the air may be compressed sufficiently for use in many cases by means of a jet of steam projected across the orifice or open end of an air-pipe, and into the cylinder in which the air is to be compressed, whereby the air-pump is, in such cases, rendered unnecessary; and in the combination of devices for securing this end by such means consists the nature of my invention.

To enable others skilled in the art to make and use my improvement, I will proceed to describe its construction and mode of operation.

A represents the cylinder in which the air is to be compressed, and which may be either what is known as the reservoir or the brake-cylinder. In the former case it is to be provided with the usual pipes leading to the brake-cylinders, and in the latter case it is fitted with the usual piston, the stem A' of which is represented in the drawing. B is a pipe communicating with the cylinder-space in which the air is to be compressed. Into this pipe B opens an air-pipe, $B^1$, in which is arranged a diaphragm, $b$, and check-valve $b'$ of the well-known construction. In the pipe B, and opposite to or in a direction across the aperture or open end of the pipe $B^1$, is a steam in-jet nozzle, D', preferably of conical form. The pipe D, to which this nozzle is attached, has a screw-thread, $d$, at each end, by which connection is made with the steam-pipe $B^2$ at one end, and the pipe B at the other. The contiguous ends of the pipes B $B^2$ are at a little distance apart, and the screw-threads on the pipe D are of such length that by the turning of the pipe D the nozzle D' may be adjusted forward and back at pleasure, so that its forward end shall be nearer to or more remote from the open end of the pipe $B^1$.

If, now, a jet of steam, at ordinary locomotive-boiler pressure, be caused to play through the nozzle D', it will have the effect of drawing air in through the pipe $B^1$, (the check-valve $b'$ rising from its seat for that purpose,) and carry it along with its own rushing current into the cylinder A, where, under the force thus introduced, a fluid-pressure can be readily attained of sufficient power for brake purposes. As soon as the maximum pressure is attained the check-valve $b'$ reseats itself, and the compressed fluid in the cylinder is there retained until allowed to escape by appropriate means. The cylinder A is furnished with any known devices for permitting the condensed water to escape.

The steam in-jet nozzle and air-pipe may be combined with each brake-cylinder on the train, or with a single main reservoir, as may be preferred, or with each of two or more reservoirs. Its use will be found advantageous in many cases in which only a moderate degree of compression is desired at the least practicable expense.

What I claim as my invention, and desire to secure by Letters Patent, is—

The combination of steam-nozzle, air-pipe, and cylinder or reservoir, when the steam-nozzle is arranged to discharge steam in the direction of the in-flow, and thus force the air along and compress it in the cylinder, substantially as and for the purposes set forth.

In testimony whereof I, the said GEORGE WESTINGHOUSE, Jr., have hereunto set my hand.

GEORGE WESTINGHOUSE, JR.

Witnesses:
JOHN H. JOHNSON,
G. H. CHRISTY.